April 3, 1928.
W. CATLIN
ANIMAL TRAP
Filed Sept. 28, 1926
1,665,020
2 Sheets-Sheet 1
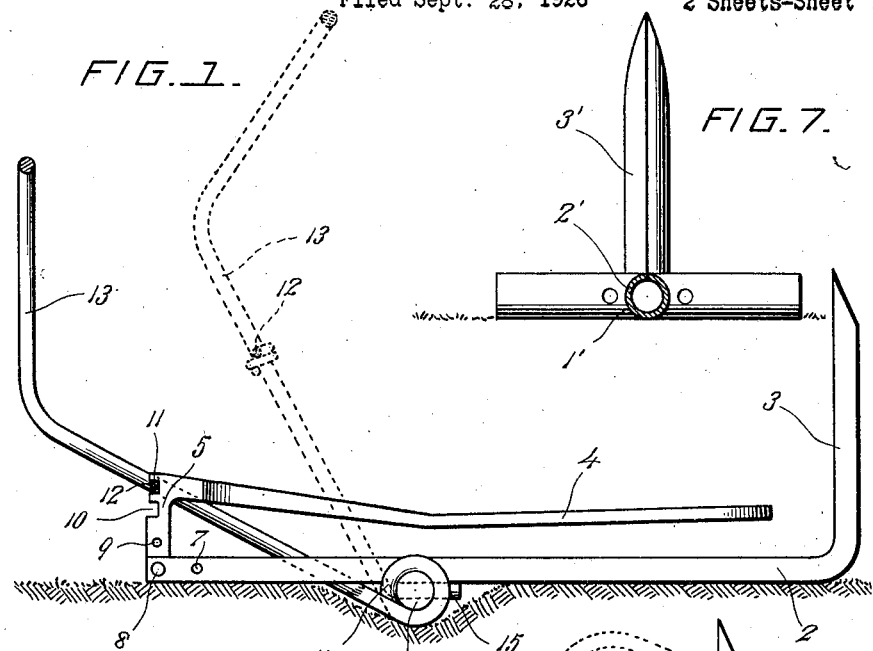
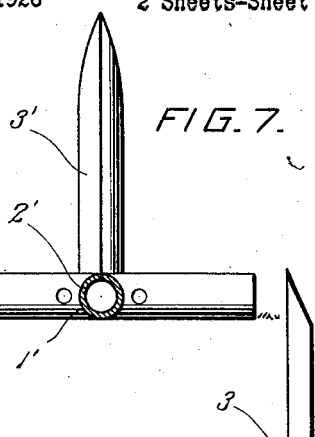
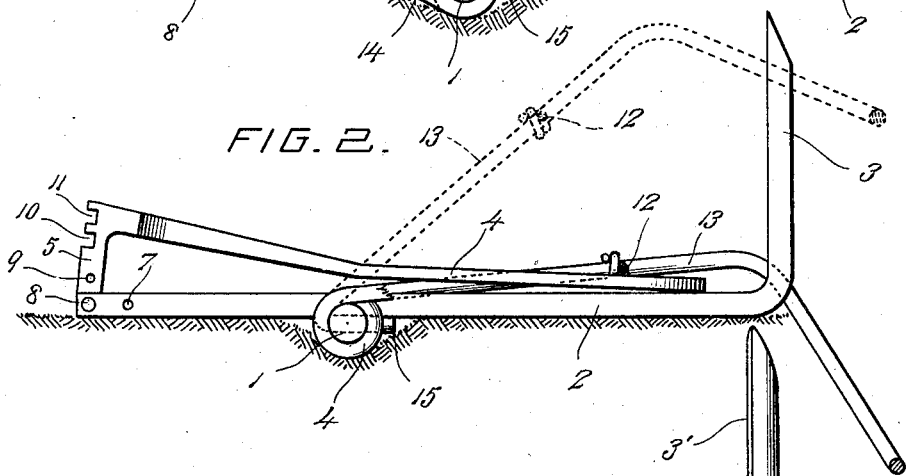
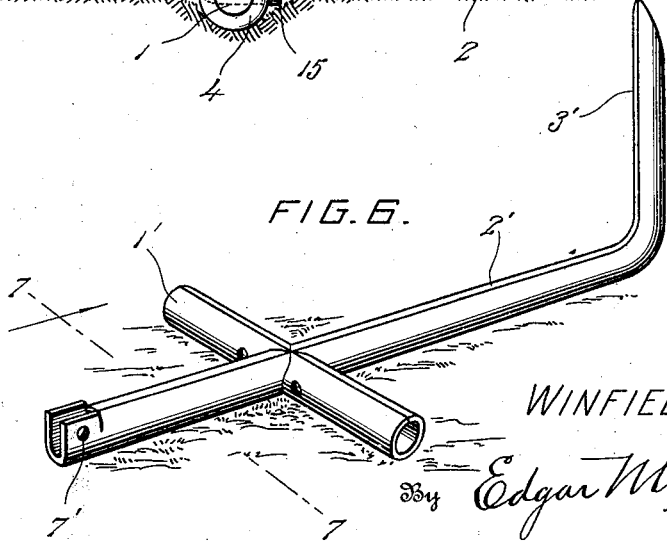
Inventor:
WINFIELD CATLIN
By Edgar M. Kitchin
his Attorney.

April 3, 1928.  
W. CATLIN  
ANIMAL TRAP  
Filed Sept. 28, 1926
1,665,020
2 Sheets-Sheet 2
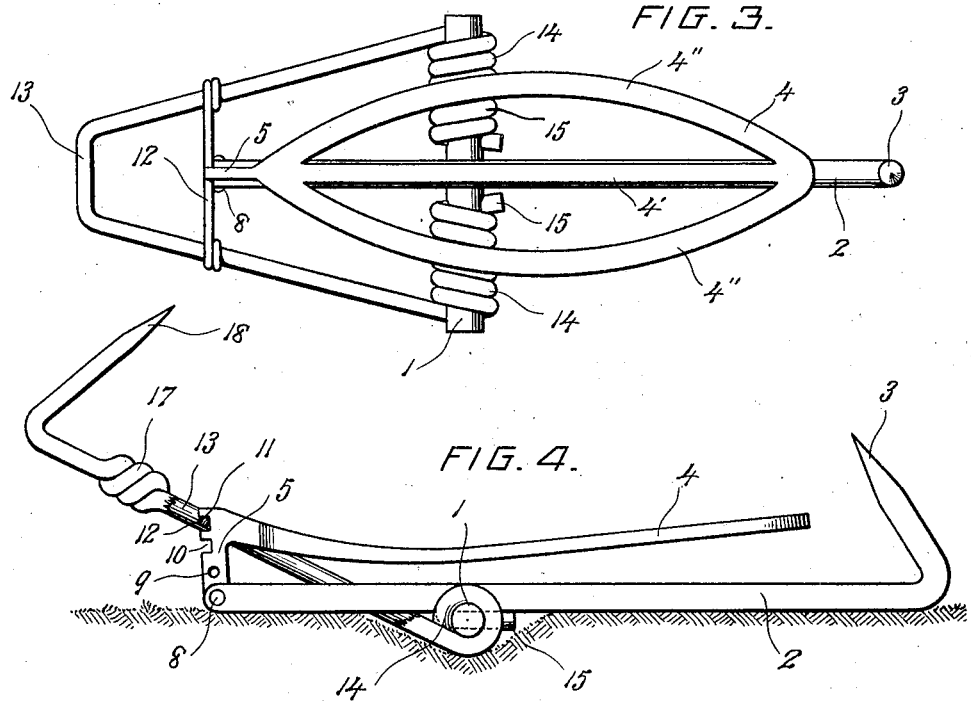
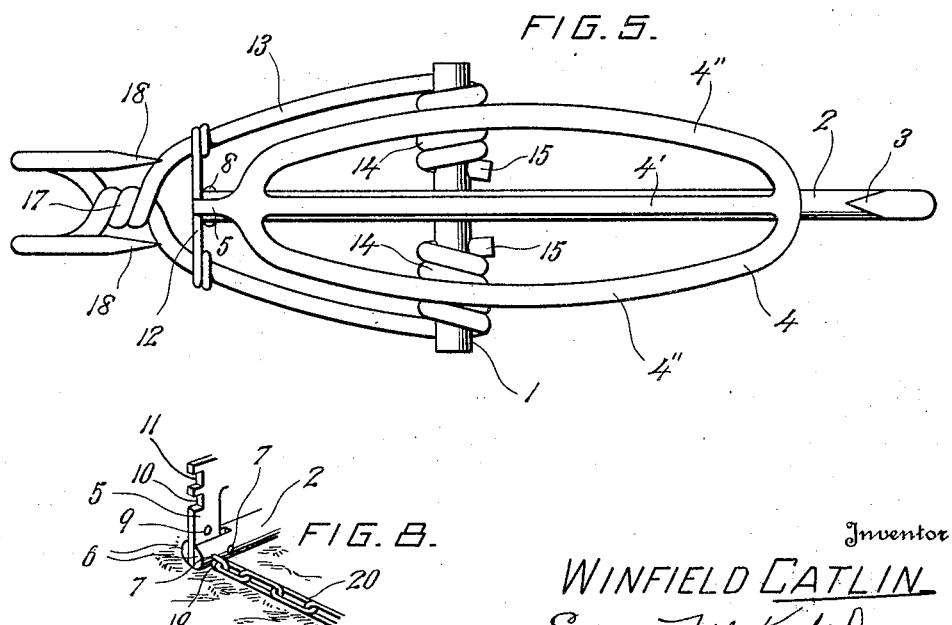
Inventor:  
WINFIELD CATLIN  
By Edgar M. Kitchin  
his Attorney.

Patented Apr. 3, 1928.

1,665,020

UNITED STATES PATENT OFFICE.

WINFIELD CATLIN, OF ROCKVILLE, INDIANA, ASSIGNOR OF ONE-HALF TO WILLIAM N. COX, OF BLOOMINGDALE, INDIANA.

ANIMAL TRAP.

Application filed September 28, 1926. Serial No. 138,213.

This invention relates to improvements in the art of traps for the catching of fur-bearing and like animals, and has as its primary object the sudden and substantially painless taking of the life of the animal trapped without injury, or with minimum injury, to its pelt.

A more detailed object is the assured and successful operation of the trap whenever contacted by an animal.

With these and further objects in view as will in part hereinafter become apparent and in part be stated, the invention comprises certain novel constructions, combinations and arrangements of parts as subsequently specified and claimed.

In the accompanying drawings,—

Figure 1 is a view in side elevation of a trap embodying the features of the present invention, one lap of the loop of the spring jaw being broken away for disclosing structure otherwise in the rear, and the spring jaw being shown in dotted lines in the partially advanced position in its progress toward closing upon the cooperating jaw.

Figure 2 is a view similar to Figure 1 of the spring jaw seen in its fully closed position in full lines and in dotted lines seen in an advanced position beyond the dotted line position of Figure 1, the location of the parts as seen in Figure 2 being relatively accurate but being idealistic in actual showing since actual compensating movement of the penetrating jaw is liable to occur.

Figure 3 is a view in top plan of the complete trap.

Figures 4 and 5 are views of a modified embodiment similar respectively to Figures 1 and 3.

Figure 6 is a perspective view of the penetrating jaw and pivot bar detached, the parts being shown as formed of sheet material instead of solid as in the preceding figures.

Figure 7 is a transverse section taken on the plane indicated by line 7—7 of Figure 6, parts being seen in elevation.

Figure 8 is a fragmentary, detail, perspective view of the trip pivot and contiguous parts modified by provision of trap anchorage means.

Referring to the drawings by numerals, 1 is a pivot bar to which is fixed the main rod 2 terminating in a penetrating jaw 3 bent preferably to a position substantially at right angles to the main portion of the bar 2. The angular relation of jaw 3 to rod 2 may, of course, be varied as found desirable. The rod 2 is welded or otherwise fixed to the pivot bar 1, and may be formed integral therewith, the rod being set at right angles to the pivot bar and extending across the same substantially midway of the length of the pivot bar. To the end portion of the rod 2, opposite the jaw 3, is pivotally connected a tread plate or trip 4, which tread plate or trip is preferably formed integral with or otherwise appropriately connected to a latch bar 5 extending substantially at right angles and downward from the tread plate 4 to and extending through the bifurcated end 6 of the rod 2. The rod 2 is formed with transverse apertures 7, 7, for receiving the pivot 8 connecting the rod 2 with the latch plate 5. Latch plate 5 is also preferably provided with several apertures 9 for facilitating adjustment of the plate 5 relative to the rod 2, it being understood that the pivot 8, preferably in the form of a rivet, may be placed through any set of apertures 7 and 9. Above the point of pivotal engagement, the latch plate 5 is formed with apertures 10 and 11 for engaging a cross rod or wire 12 carried by the arms of the loop comprising the spring jaw 13.

The arms of the spring loop or jaw 13 extend down to and are wrapped about the pivot bar 1 to form actuating spring coils 14, 14, the extreme terminals of the spring arms extending through apertures in the bar 1 and terminating at 15, 15, for retaining the jaw 13 under spring tension, and the tension is preferably maintained comparatively high for insuring such velocity in closing of the jaws when released as to effect substantially instant killing of the animal engaged. The loop or free extremity of the spring jaw 13 is preferably located to pass over and contiguous to the penetrating point of the jaw 3.

The trip or tread 4 is of special construction, being preferably formed of a middle bar 4′ and side bars 4″, 4″, formed integral at their terminals with the terminals of the bar 4′, as seen in Figure 3, but spaced from the bar at intermediate points for leaving openings so that sticks, pebbles, or other foreign substances, will not be liable to clog the action of the tread. In other words, with the old style tread or trip it has occurred that foreign substances have become located beneath the tread and prevented the tread from descending sufficiently to trip; whereas the tread constructed as just described any small article, like a small branch or pebble, may pass up through the openings in the tread, or the tread may pass down over such articles and thus function notwithstanding their presence. Also, a tread or trip of the type just described when applied to a steel trap or other large jaw trap designed for the capturing of larger animals will allow portions of the foot of the animal to descend into the space surrounded by the several bars or rods of the tread, and thus allow the jaws of such steel trap to engage the members of the trapped animals at higher points than otherwise.

The present improved trap, however, is especially designed for small fur-bearing animals and is capable of numerous methods of setting, and may be effectively set in any place or in any manner that an ordinary steel trap may be set. When setting the trap, as indicated in Figure 1, it is desirable to form a slight depression in the ground or other supporting surface so that the rod 2 may lie flat upon the ground while the downwardly extending part of bar 1 and the coils 14 will be accommodated in the dug-out portion. Any mechanical equivalent of this arrangement may be utilized, as, for example, the employment of sticks, or other supports, for the parts at the opposite sides of the coils 14. When so set, the trap is sprung by the animal stepping upon it, and if the body of the animal is too large to be surrounded by the closing jaws of the trap, the penetrating jaw 3 will enter the side of the animal owing to the force of coiled springs 14, and will kill the animal quickly and mercifully.

The trap is also well adapted for a special setting for the purpose of catching an animal around the neck and causing death by strangulation. For this purpose, the trap is set upon snow, sticks, stones, or earth, arranged in front of a bait cubby in such a way as to compel the animal to reach over the trap in approaching the cubby to get the bait. When the animal does this, the throat or a portion of the body of the animal contacts with the trip and springs the trap. Only a slight descent of the trip is required for causing the wire or rod 12 to escape from notch 11 and to thus release jaw 13, which springs with considerable velocity from the position seen in full lines in Figure 1 through the positions seen in dotted lines in Figures 1 and 2 toward the position seen in full lines in Figure 2. Of course, the parts cannot actually reach the position seen in full lines in Figure 2, because of the interposition of the animal's body. Depending upon the size of such body, the approximate position of cessation of movement of the spring jaw 13 will be substantially that indicated in dotted lines in Figure 2, but may vary quite materially according to the size of the animal engaged. The velocity of the spring jaw 13 is sufficient to cause strangulation or crushing and instant killing of the animal if small enough to occupy the space enclosed between the jaw 3 and the dotted line position of jaw 13 in Figure 2.

It should be understood, of course, that the described action is more or less idealistic, and that the reaction of jaw 3 may be sufficiently powerful, and in many instances will be, to cause it to lift from the ground and approach the jaw 13, moving not only on the bar 1 as a pivot but also moving on the end of rod 2 at the pivot 8. In other words, the force of the springs 14 may cause the two jaws 3 and 13 to jump toward each other and thus cause the trap to assume an actual position somewhat different from that illustrated in the accompanying drawings, but the relative position of the parts will be the same and the results will correspond with those described.

In Figures 4 and 5, I have illustrated a slightly modified embodiment of the trap in which the same reference numerals and the same description will apply, except as to the terminals of the two jaws, which alone require separate description. In this embodiment, the spring arms of the jaw 13 are preferably twisted together at 17 and extend beyond the same in the form of bent terminating points 18, 18. The penetrating portion of the jaw 3 in this structure is preferably also set at a more abrupt angle than as seen in the structure above described, and the parts are so located that the jaw 3 will lie between the penetrating points 18, when the trap is collapsed. Thus, when the animal effects the tripping action, the penetrating points will engage the two sides of the animal and enter its body for quickly killing it. However, the penetrating points, whether of the jaw 3 as seen in Figure 1 or of the jaws as seen in Figure 4, are sufficiently reduced to do a minimum amount of injury to the pelt, and may be readily removed by the trapper when recovering the game without any substantial injury to the fur. It is to be noted that the notches 10 and 11, as well as the apertures 7 and 9, are employed for purposes of adjustment of the parts. Either of the notches 10 or 11 is used, according to the elevation of the trip or tread 4 desired, which will be governed by the location of the bait and the environments of the trap and the probable size and habits of the animal to be trapped, it being understood that by the use of the notch 10, tread 4 can be caused to lie slightly nearer the rod 2 than by the use of the notch 11.

In Figures 6 and 7 is illustrated a slightly modified embodiment of the pivot bar and its engaged rod and jaw. In this structure, all of these parts are formed of sheet metal shaped to produce a tubular pivot bar 1' formed integral with a similarly tubular rod 2' having the penetrating jaw 3'. Of course, the jaw 3' may be cylindrical as is the bar 1', or may be triangular as shown, or otherwise formed as preferred. The free terminal of the rod 2' beyond the pivot bar 1' is preferably provided with spaced upstanding ears apertured at 7' for receiving the rivet of the latch plate, not shown.

While not shown in any of the other figures than Figure 8, any of the traps illustrated may be provided with an extension for the pivot 8 of latch 5, and such extension may be bent to form an eye 19 engaged by a chain 20, or other appropriate cable, adapted for anchorage to a tree or other means of retention for preventing the trap from being carried away in case an animal is engaged by the trap of such strength and size as to otherwise enable its removal.

What I claim is:—

1. An animal trap comprising a pivot bar, a rod extending across and connected to the bar and terminating in a jaw at one end, a trip pivoted to the other end of the rod, a spring-stressed jaw engaging the pivot bar to swing about the axis thereof to move to a trapping position relative to the other jaw, and means releasably engaged by the trip for retaining the jaws open.

2. An animal trap comprising a pivot bar, a rod extending across the bar and connected thereto, one terminal of said rod being formed into a jaw, a latch bar pivotally engaging the other terminal portion of the rod and upstanding from the rod, a tread extending from the latch bar above the rod and substantially parallel thereto, a spring-stressed jaw engaging the pivot bar to move about the same to and from a closed position with respect to the jaw, and means carried by the second-mentioned jaw adapted to releasably engage the latch bar for retaining the jaws open.

3. An animal trap comprising a pivot bar, a rod extending across the bar and connected thereto, one terminal of said rod being formed into a jaw, a latch bar pivotally engaging the other terminal portion of the rod and upstanding from the rod, the face of said latch bar being notched, a tread extending from the latch bar above the rod and substantially parallel thereto, a spring-stressed jaw engaging the pivot bar to move about the same to and from a closed position with respect to the jaw, and means carried by the second jaw adapted to releasably engage the notched face of the latch bar for retaining the jaws open.

4. An animal trap comprising a rod having a jaw at one terminal, a trip pivotally connected to the other terminal portion of the rod, a spring-stressed jaw pivoted relative to the rod to cooperate with the first-mentioned jaw and comprising a pair of arms, and a wire connecting the arms in position for releasably engaging the trip for retaining the jaws in an open position.

5. An animal trap comprising a pivot bar, a rod extending across said bar and connected thereto and carrying a jaw, a cooperating jaw mounted to swing about the pivot bar as an axis in moving toward and from the first-mentioned jaw, springs engaging and carried about the bar and connected to actuate the second-mentioned jaw for stressing the same toward the first-mentioned jaw, and a trip movable relative to the jaws and engaging the same for releasably retaining the jaws in open position.

6. An animal trap comprising a pivot bar, a rod connected thereto and having a jaw, a spring jaw cooperating with the first-mentioned jaw and having terminals curved about and engaging the pivot bar for spring stressing the second-mentioned jaw toward the first-mentioned jaw, and a trip for releasably retaining the jaws in open position.

7. An animal trap comprising a pivot bar, a rod connected thereto and having a jaw, a spring jaw cooperating with the first-mentioned jaw and having terminals curved about and engaging the pivot bar for spring stressing the second-mentioned jaw toward the first-mentioned jaw, a trip for releasably retaining the jaws in open position, and a keeper carried by the parts of the second-mentioned jaw and adapted to thus releasably engage said trip.

8. An animal trap comprising a rod having a jaw, a pivot bar connected to the rod, a cooperating jaw having spring arms coiled about the bar and having terminal engagement therewith for stressing the second jaw toward the first jaw, and a trip engaging the jaws for releasably retaining the same in open position.

9. An animal trap comprising a rod having a jaw, a bar connected to the rod, coiled springs surrounding the bar and having terminal portions extending through the bar, other portions of said springs extending away from the bar and forming a jaw cooperating with the first-mentioned jaw, the coiled springs being tensioned to stress the second-mentioned jaw toward the first-mentioned jaw, and a trip for releasably retaining the jaws in open position.

10. An animal trap comprising a rod having a jaw, a bar connected to the rod, coiled springs surrounding the bar and having terminal portions fixedly engaging the bar, other portions of said springs extending away from the bar and forming a jaw cooperating with the first-mentioned jaw, the coiled springs being tensioned to stress the second-mentioned jaw toward the first-mentioned jaw, a latch bar pivoted to the rod and having a notched face, a wire connecting parts of the second-mentioned jaw in position for engaging the notched face of the latch bar for locking the jaws in an open position, and a tread carried by the latch bar for releasing such engagement when the tread is moved.

11. An animal trap comprising a rod formed into a jaw, spring arms formed into a cooperating jaw and tensioned to stress the second-mentioned jaw toward the first-mentioned jaw, a wire connecting the arms of the second-mentioned jaw, and a trip pivotally connected to the rod of the first-mentioned jaw and having a notched portion adapted to engage said wire for releasably locking the jaws in open position.

12. An animal trap comprising a pivot bar, a rod integral therewith and extending substantially at right angles thereto and formed with a jaw, the pivot bar being proportioned to retain the rod with the jaw upstanding when the rod and bar are lying on a supporting surface, a spring stressed jaw engaging the bar to move about the same as an axis relative to the first-mentioned jaw, and means for releasably retaining the jaws in an open position.

13. An animal trap comprising a pivot bar, a rod integral therewith and extending substantially at right angles thereto and formed with a jaw, a spring stressed jaw engaging the bar to move about the same as an axis relative to the first-mentioned jaw, and means for releasably retaining the jaws in an open position, the rod and bar being formed of sheet material.

14. An animal trap comprising a pivot bar, a rod connected thereto and having a jaw, the bar being proportioned and located to sustain the rod with the jaw-upstanding when the rod and bar are lying on a supporting surface, a jaw cooperating with the first jaw and pivotally engaging said bar, means for spring stressing the second jaw toward the first jaw, and a trip for releasably retaining the jaws in open position.

In testimony whereof I affix my signature.

WINFIELD CATLIN.